US006983924B2

(12) United States Patent
Howell et al.

(10) Patent No.: US 6,983,924 B2
(45) Date of Patent: Jan. 10, 2006

(54) COMPLIANT, ORTHO-PLANAR, LINEAR MOTION SPRING

(75) Inventors: Larry L. Howell, Orem, UT (US);
Scott Thomson, Provo, UT (US);
Jason Alan Briscoe, Provo, UT (US);
John J. Parise, Lauderhill, FL (US);
Shae Lorenc, Idaho Falls, ID (US);
John B. Larsen, Provo, UT (US);
Curtis R. Huffmire, Provo, UT (US);
Nathan Burnside, Provo, UT (US);
Troy A. Gomm, Provo, UT (US)

(73) Assignee: Brigham Young University, Provo, UT (US)

( * ) Notice: Subject to any disclaimer, the term of this patent is extended or adjusted under 35 U.S.C. 154(b) by 95 days.

(21) Appl. No.: 10/258,568

(22) PCT Filed: Apr. 25, 2001

(86) PCT No.: PCT/US01/13351

§ 371 (c)(1),
(2), (4) Date: Jun. 30, 2003

(87) PCT Pub. No.: WO01/81785

PCT Pub. Date: Nov. 1, 2001

(65) Prior Publication Data

US 2004/0021123 A1 Feb. 5, 2004

Related U.S. Application Data

(60) Provisional application No. 60/199,905, filed on Apr. 26, 2000.

(51) Int. Cl.
*F16F 1/34* (2006.01)
(52) U.S. Cl. ...................... 251/118; 251/902; 267/158; 267/160

(58) Field of Classification Search ................ 251/118, 251/902; 267/160, 158
See application file for complete search history.

(56) References Cited

U.S. PATENT DOCUMENTS

| 1,029,097 | A | * | 6/1912 | Atkinson | ..................... 251/902 |
| 1,359,279 | A | * | 11/1920 | Sansoucy | ..................... 251/902 |
| 1,826,597 | A | * | 10/1931 | Brecht | ........................ 267/162 |
| 3,575,342 | A | | 4/1971 | Puster | |
| 3,577,184 | A | | 5/1971 | McNeel et al. | |
| 3,602,490 | A | | 8/1971 | Mueller et al. | |
| 3,742,441 | A | | 6/1973 | Riley | |
| 3,817,488 | A | | 6/1974 | Mack | |

(Continued)

*Primary Examiner*—John Bastianelli
(74) *Attorney, Agent, or Firm*—Thorpe North & Western

(57) ABSTRACT

An ortho-planar spring has a platform movably coupled to a base and being movable linearly with respect to the base along at least a portion of an axial direction perpendicular to both a base surface and a platform surface. A resilient and flexible connecting structure is connected to and between the base and platform. The connecting structure is bendable to develop (i) an axial force along the axial direction to bias the platform in a stable position with respect to the base, and (ii) non-axial forces which substantially sum to zero to preserve the orientation of the platform with respect to the base. Thus, the spring is very compact and does not have rotation between the deflecting ends. The spring may be associated with a valve opening, and a button for restricting flow through the valve opening, to bias the button at a position with respect to the valve opening.

56 Claims, 8 Drawing Sheets

U.S. PATENT DOCUMENTS

| | | | |
|---|---|---|---|
| 3,896,834 A * | 7/1975 | Paul, Jr. ..................... 251/902 |
| 3,921,670 A | 11/1975 | Clippard, Jr. et al. |
| 3,937,242 A | 2/1976 | Eckert |
| 4,196,751 A | 4/1980 | Fischer et al. |
| 4,323,994 A | 4/1982 | Coogler |
| 4,327,257 A | 4/1982 | Schwartz |
| 4,458,344 A | 7/1984 | Coogler |
| 4,548,382 A | 10/1985 | Otting |
| 4,623,991 A | 11/1986 | Vitringa |
| 4,638,830 A | 1/1987 | Brown et al. |
| 4,685,094 A | 8/1987 | Vitringa et al. |
| 5,134,594 A | 7/1992 | Woo |
| 5,303,738 A * | 4/1994 | Chang et al. ............... 251/902 |
| 5,492,313 A | 2/1996 | Pan et al. |
| 5,555,222 A | 9/1996 | Woo |
| 6,668,849 B2 * | 12/2003 | Onstenk et al. ............. 251/902 |

* cited by examiner

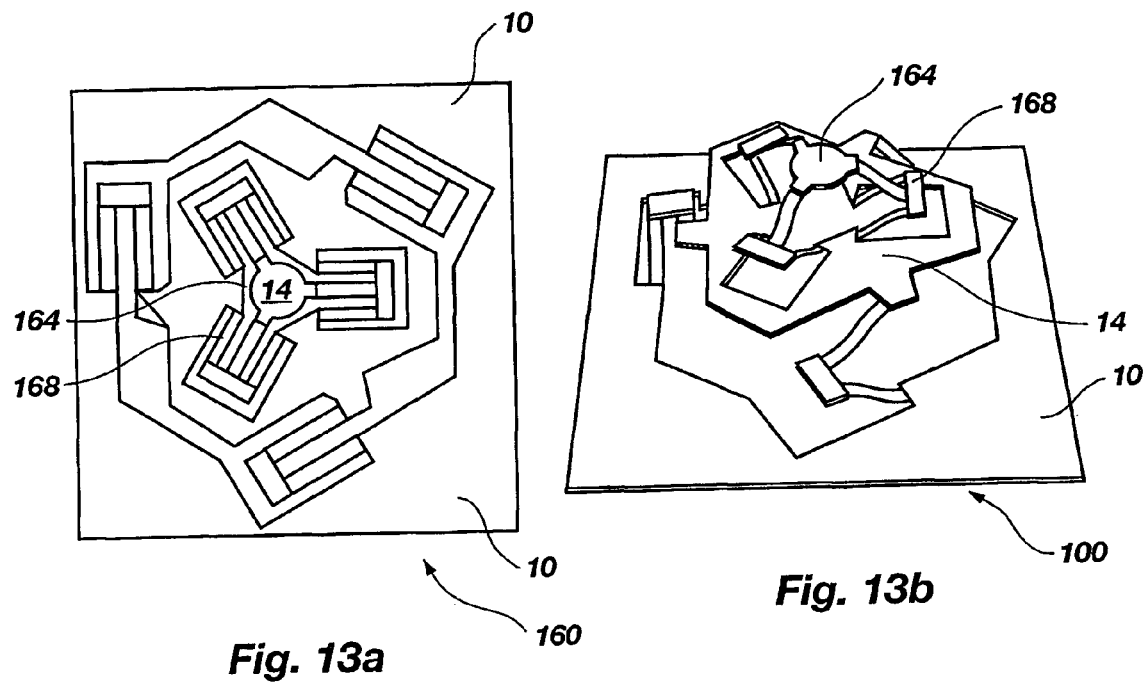
Fig. 13a
Fig. 13b
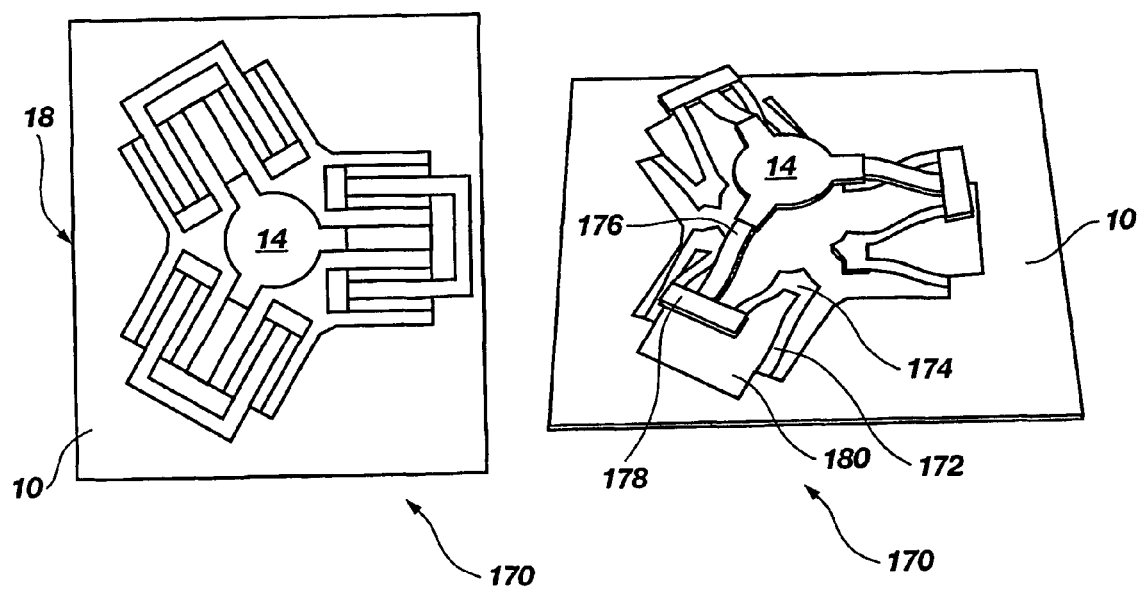
Fig. 14a
Fig. 14b

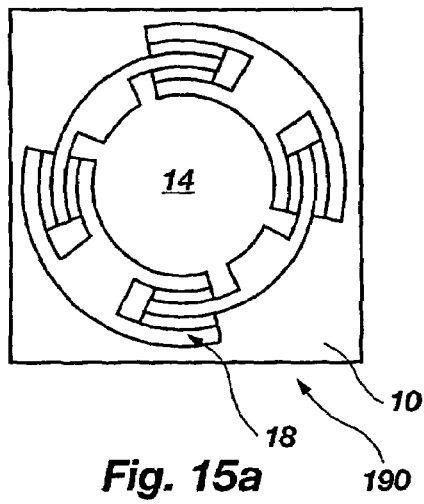
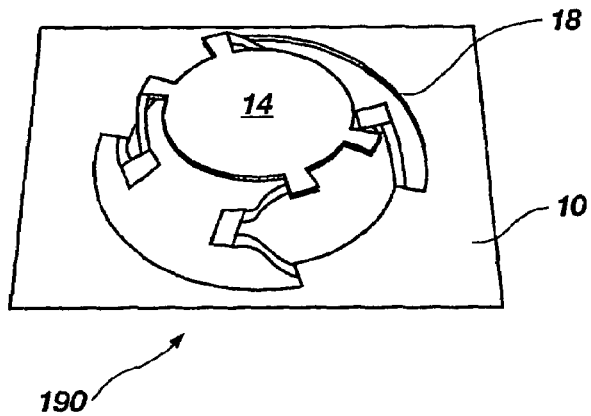
Fig. 15a  Fig. 15b
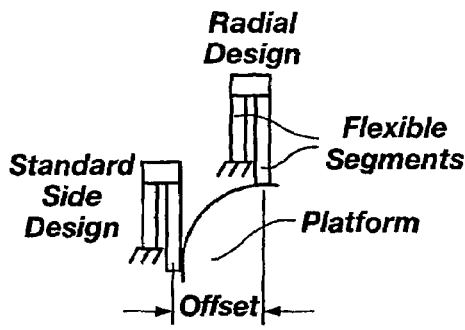
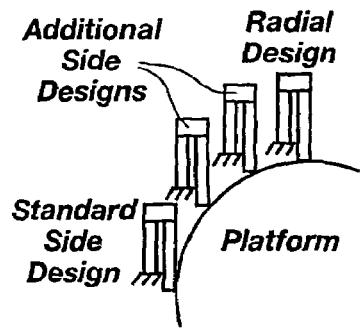
Fig. 16a  Fig. 16b
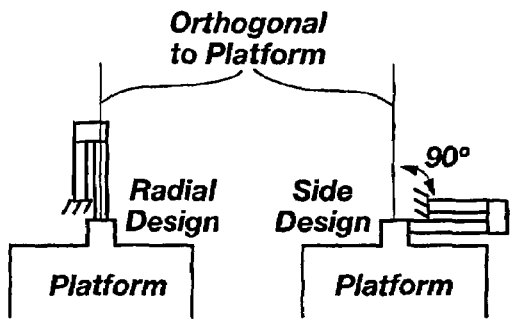
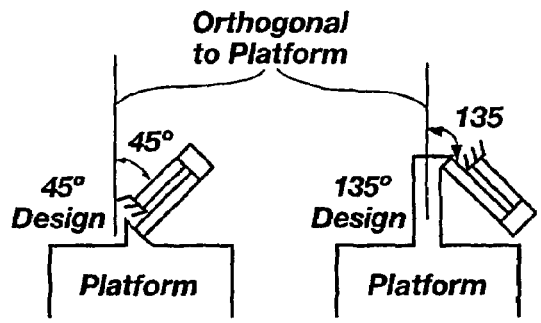
Fig. 17a  Fig. 17b  Fig. 17c  Fig. 17d

COMPLIANT, ORTHO-PLANAR, LINEAR MOTION SPRING

This application claims the benefit of provisional application No. 60/199,905 filed Apr. 26, 2000.

The U.S. Government has rights to this invention pursuant to Grant No. MSS-8902777 awarded by the National Science Foundation.

BACKGROUND OF THE INVENTION

1. The Field of the Invention

The present invention relates generally to a spring, which are particularly useful in pneumatic instruments, such as valve controllers. More particularly, the present invention relates to springs that can be fabricated, or compressed, into a single plane, but have motion out of that plan, and one-piece, compliant springs with a platform that does not have substantial rotation throughout its deflection.

2. The Background Art

An ortho-planar spring can be defined as a spring which can be either fabricated in or compressed down into a single plane, with motion out of that plane. Prior art that fit this definition are the Belleville or disc spring 2 (FIG. 1a), the volute (conical) spring 4 (FIG. 1b), and the spider (geophone) spring 6 (FIG. 1c). These types of springs are used in bolt assemblies, disc brake assemblies, valves, pneumatic controllers, and many other applications. A major advantage of these types of springs over traditional linear springs is that they are very compact and, in many cases, they can be easily manufactured.

The disc spring 2 (FIG. 1a) is manufactured in a slightly out-of-plane position and provides resistance as it is forced down towards the plane. The volute spring 4 (FIG. 1b) is a thin strip of steel wound so that the coils fit inside of each other. It also provides resistance as it is forced down towards the plane. The spider spring 6 (FIG. 1c) is usually manufactured in the plane and provides resistance as it is forced in either direction out of this plane of fabrication. (More discussion on currently existing springs is available in common sources such as Wahl, 1963, Juvinell, 1983, and Parmley, 1985.)

One of the disadvantages of the prior art, like the spider and volute springs, is that they require some rotation to occur during their operation. One disadvantage of rotation is that anything fixed to the surface of the platform will be required to rotate with the platform. Second, if the platform is not fixed to the adjacent part, then the two components are left to slide against each other, causing wear to both parts as well as vibration and noise. The abrasion also causes particle generation which can be a problem in many environments, such as in pneumatic positioners with small nozzles, or cleanrooms used for microelectronics fabrication. Another problem with rotation is that if the platform shape is not circular, a rotating platform may require more clearance in order to avoid contact with nearby structures. This requires that a larger surface area be available to accommodate the spring that needs to obtain a given deflection. One final disadvantage is that rotation in the spider spring legs adds torsional stresses to the members.

The disc springs, like the Belleville, require clearance for either the outer or inner edges of the spring to slide. The assembly tolerances are also required to be quite tight, increasing the cost of the assembly.

One application of such springs is in pneumatic instrumentation. In pneumatic controls, a nozzle and a baffle are used to get a feedback pressure of 3–15 psi, as well as output pressures of the same magnitude. A regulated pressure of 20 psi is supplied to an instrument, and it is routed through the nozzle. As the baffle rests up against the nozzle, it causes a back pressure. The nozzle is spring loaded to give it the force. The back pressure of 0–20 psi is then used to measure, transmit, or control a process. In the case of measuring, the feedback signal of 3–15 psi can be equal to any parameter being measured. For example, in the case of temperature, 3–15 psi can be equal to 0–100 degrees. In the case of transmitting, the 3–15 psi can be run over long distant lines to read the same 0–100 degrees in a control room some distance away from the actual process. In the case of control, the 3–15 psi can be used to regulate a control valve, pneumatic cylinder, or the like. In all of these cases, the nozzle and baffle serve the same function; i.e. to get a feedback pressure of 3–15 psi. The feedback pressure may be used for different application, but the basic construction and designs are the same. Current nozzle and baffle technology has adequate resolution, but may be improved. One disadvantage is that baffles are typically positioned at an angle, causing potential hysteresis and repeatability problems.

Therefore, it would be advantageous to develop an ortho-planar spring capable of providing linear motion without significant rotation. It would also be advantageous to develop such a spring for use in pneumatic instrumentation.

OBJECTS AND SUMMARY OF THE INVENTION

It is therefore an object of the present invention to provide an ortho-planar spring with substantially linear motion, and without significant rotational motion.

It is another object of the present invention to provide such a spring for use with pneumatic instruments.

The above objects and others not specifically recited are realized in a specific illustrative embodiment of a spring with a platform movably coupled to a base, and movable linearly along at least a portion of an axial direction, which is perpendicular to both the platform and base, without pivoting about the axial direction. A resilient and flexible connecting structure advantageously is connected to and between the base and platform. The connecting structure is bendable to develop axial force and non-axial force. The axial force is along the axial direction to bias the platform in a stable position with respect to the base. The non-axial forces advantageously substantially sum to zero to preserve the orientation of the platform with respect to the base. Thus, a platform surface remaining substantially parallel to a base surface as the platform moves with respect to the base.

The base advantageously has an aperture or opening sized to receive the platform and connecting structure. The platform is movable to a location in which a surface of the platform is parallel to, and co-planar with, a surface of the base, or to a location within the aperture of the base, and within the thickness of the base. All or portions of the base, platform and connecting structure may be integrally formed from a single sheet of material.

The connecting structure has one or more sets of flexible and resilient members, each set being coupled in series between the base and platform. Each set includes at least two resilient and flexible members which are coupled in series between the base and platform. The connecting structure may have one, two, three, four, five, or any number of sets.

In accordance with one aspect of the present invention, the members may be oriented to extend substantially radially with respect to the axial direction. Alternatively, the members may be oriented to extend substantially laterally with respect to the axial direction. In addition, the members may be equal length, and arcuate.

In accordance with another aspect of the present invention, an intermediate platform may be disposed between the members. The at least two members may include two members each extending from one of the base or platform to the intermediate platform. Alternatively, an intermediate flexible and resilient member may be coupled to and between the at least two members.

In accordance with another aspect of the present invention, any member may include a pair of members each extending in parallel.

In accordance with another aspect of the present invention, the platform is a primary platform, and acts as a secondary base for a secondary platform which is movably coupled to the primary platform. The secondary platform also is movable along at least a portion of the axial direction without pivoting about the axial direction. A secondary, resilient and flexible connecting structure is connected to and between the primary platform and secondary platform. The secondary connecting structure is bendable to develop (i) an axial force along the axial direction to bias the secondary platform in a stable position with respect to the primary platform, and (ii) non-axial forces which substantially sum to zero to preserve the orientation of the secondary platform with respect to the primary platform.

In accordance with another aspect of the present invention, the spring may be associated with a valve opening of a valve controller or the like, and means for restricting flow through the valve opening. The spring biases the means for restricting flow at a position with respect to the valve opening.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 13a is a top view of a ninth presently preferred embodiment of a spring of the present invention;

FIG. 13b is a perspective view of the ninth presently preferred embodiment of a spring of the present invention;

FIG. 14a is a top view of a tenth presently preferred embodiment of a spring of the present invention;

FIG. 14b is a perspective view of the tenth presently preferred embodiment of a spring of the present invention;

FIG. 15a is a top view of an eleventh presently preferred embodiment of a spring of the present invention;

FIG. 15b is a perspective view of the eleventh presently preferred embodiment of a spring of the present invention;

FIGS. 16a and 16b are schematic views of the segments or members of the springs of the prevent invention;

FIGS. 17a–17d are schematic views of the segments or members of the springs of the present invention;

DETAILED DESCRIPTION

Figure 1A:
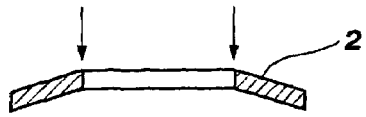
FIG. 1a is a cross-sectional side view of a prior art Belleville disk spring.
Figure 1B:
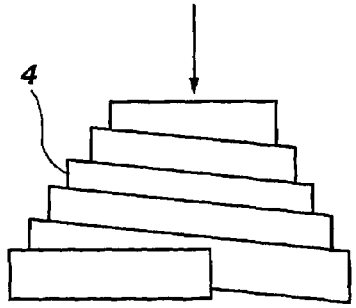
FIG. 1b is a side view of a prior art volute spring.
Figure 1C:
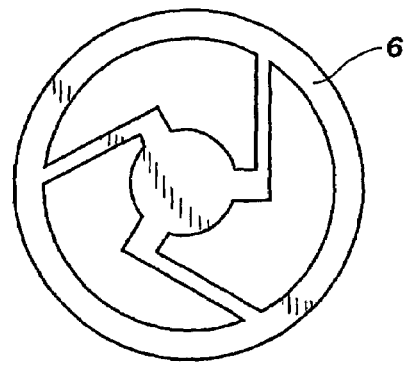
FIG. 1c is a top view of a prior art spider spring.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

As illustrated in the Figures, a new type of ortho-planar spring has been designed that has the potential of possessing all of the advantages of conventional ortho-planar springs, without most of the disadvantages. This new spring operates by raising or lowering its platform relative to the base without substantial rotation of this platform in the x, y, or z direction. Because of its planar nature it can be fabricated using any number of fabrication methods, including stamping, laser cutting, water jet cutting, wire EDM, milling and injection molding. The fully compliant version requires no assembly and it is very compact. It can be constructed out of many kinds of materials, and prototypes have been constructed of several materials including stainless steel, aluminum, polypropylene, and polycrystaline silicon. The compactness, ease of manufacture, and elimination of rotation make it useful in many applications where space, cost, or wear are important.

Each spring has a base 10 and a platform 14 movably coupled to the base by a resilient and flexible connecting structure 18, such as legs, or sets of members. The platform 14 moves linearly along at least a portion of an axial direction 22, which is perpendicular to both the base 10 and platform 14, without substantially pivoting about the axial direction 22. Thus, the platform 14 and base 10 remain substantially parallel. The connecting structure 18 is bendable to develop axial and non-axial forces. The axial forces are directed along the axial direction 22 to bias the platform 14 in a stable position with respect to the base 10. The non-axial forces substantially sum to zero, or cancel each other, to preserve the linear motion of the platform 14, and the parallel orientation of the platform 14 and base 10.

The base 10 has a base surface 26 and the platform 14 has a platform surface 30 which remain substantially parallel with respect to one another during movement of the platform 14. The axial direction 22 is perpendicular to both the base and platform surfaces 26 and 30. In addition, the base 10 has a thickness. An aperture or opening 34 is formed in the base 10, and is sized to receive the platform 14 therein. The platform 14 is movable between a location which is spaced-apart from the base 10, as shown in the Figures, and a location in which the platform 14 is within the aperture 34 and thickness of the base 10, and the base and platform surfaces 26 and 30 are co-planar. Thus, the springs may be completely flat.

It is of course understood that the springs may be configured with the base 10 and platform 14 initially spaced-apart and resistant to movement towards one another, or may be configure with the base 10 and platform 14 co-planar, and resistant to movement away from one another. In addition, the base 10, platform 14, and connecting structure 18 may be integrally formed from a single sheet of planar or flat material. The material, and thus the connecting structure 14, may be compliant to allow the connecting structure 14 to bend, and to allow the connection of the connecting structure 14 to the base 10 and platform 14 to bend. Additional re-enforcement may be added to the base 10 and platform 14 so that they are thicker, and less resistant to bending, while the connecting structure 18 may be thinner, and more flexible.

Figure 2A:
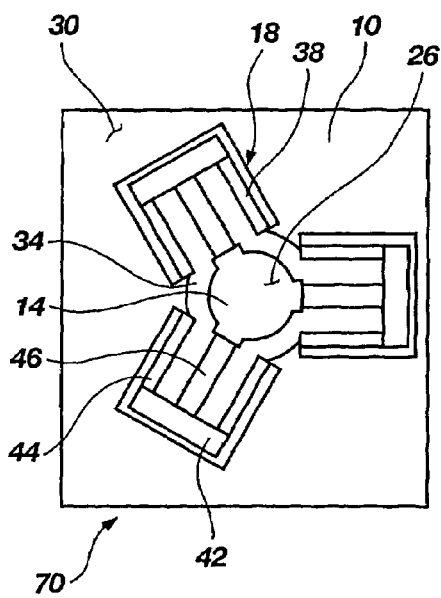
FIG. 2a is a top view of a first presently preferred embodiment of a spring of the present invention.
Figure 2B:
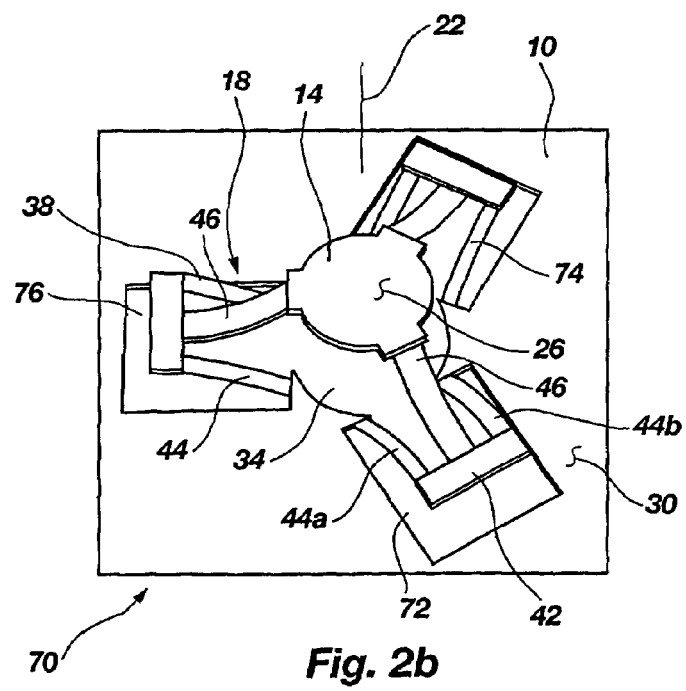
FIG. 2b is a perspective view of the first presently preferred embodiment of the spring of the present invention.
Figure 3A:
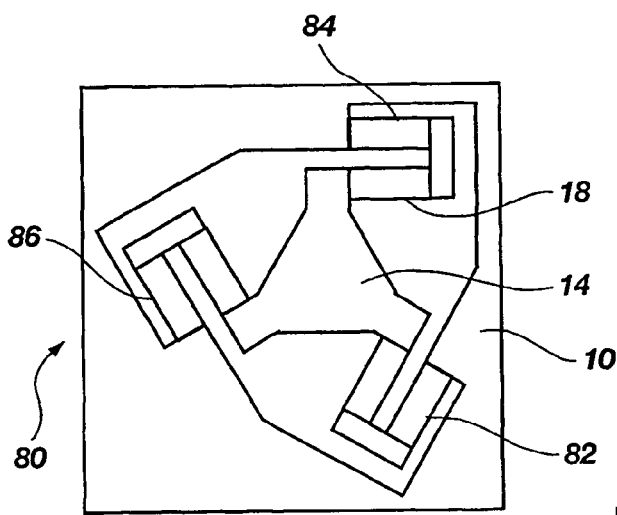
FIG. 3a is a top view of a second presently preferred embodiment of the spring of the present invention.
Figure 3B:
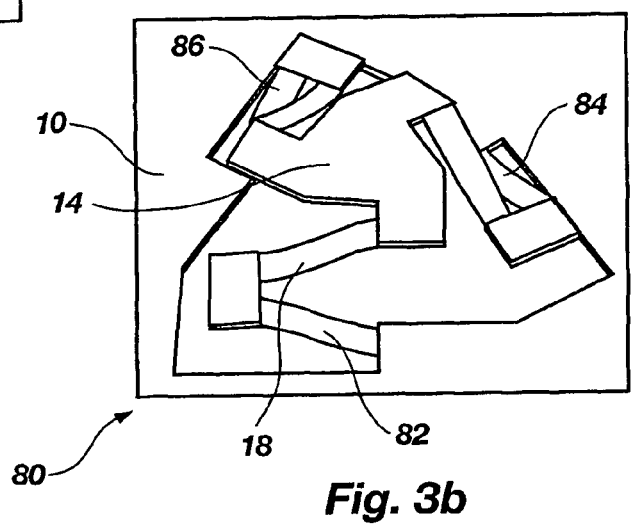
FIG. 3b is a perspective view of the second presently preferred embodiment of the spring of the present invention.

The connecting structure 18 may include one or more legs, or sets of segments or members 38, which may extend at any angle from the platform 14 or base 10. The connecting structure 18 also may include an intermediate platform 42 coupled between the segments or members 38. For illustrative purposes, two special cases are presented in detail: the radial design and the side design. The radial leg design has its flexible segments 38 extending radially away from the platform's center, as shown in FIGS. 2a and 2b. The side leg design has its flexible segments 38 offset from the radial attachment points, as shown in FIGS. 3a and 3b. Both leg designs result in non-rotational motion of the platform 14, as do configurations with the legs at other angles.

Each leg or set of members 38 of the connecting structure 18 includes first and second flexible and resilient members 44 and 46. The first member 44 has a first end at the base 10, and extends from the base 10 to a second end. The first member 44 may extend to the intermediate platform 42, as shown in FIGS. 2a and 2b. The second member 46 has a first end at the platform 42, and extends from the platform 42 to a second end. The second member 46 may extend to the intermediate platform 42, as shown in FIGS. 2a and 2b, such that the second ends of the members 44 and 46 are directly connected through the intermediate platform 42. Alternatively, the second ends of the members 44 and 46 may be indirectly coupled through another member, as shown in FIGS. 14a and 14b. The members 44 and 46 are coupled in series between the base 10 and platform 14. Referring to FIG. 2a, the members 44 and 46 of each set preferably form distinct, independent segments, rather than a continuous, single segment.

The connecting structure 18, or first and second members 44 and 46, bends to develop axial forces in the axial direction 22, and non-axial forces. Thus, as the platform 14 moves with respect to the base 10 along the axial direction 22, the connecting structure 18 bends. The first and second members 44 and 46 bend towards their ends, or the second ends bend closer to the first ends. Thus, the intermediate platform 42 moves laterally or transverse to the axial direction 22. In the case of the radially extending members, the intermediate platform 42 moves inwardly towards the center as the platform 14 moves away from the base 10. The axial forces act to force the platform 14 towards or away from the base 10, directing the platform 14 along the linear movement path 22, and bias the platform 14 in a stable position with respect to the base 10. The non-axial forces tend to force the platform 14 along a movement path out of the linear movement path 22. The sum of the non-axial forces, or the members 44 and 46, or of the connecting structure, are substantially zero, thus maintaining the orientation of the platform 14 and base 10.

All of the springs that follow are made unique by variations on three basic components: (1) the number of legs, (2) the number of flexible segments in each leg, and (3) the leg style or class. A single leg or set of members 38 is defined as all of the segments 38 between the base and the platform on a given side (i.e. the flexible segments 38 and the intermediate platform 42).

Within all of the classes of the newly designed springs, the number of legs that attach to the platform can be as few as two, or as many as desired. For the purposes of naming the various designs, a classification system has been created which uses the number of legs as the first descriptive section in the name. The system uses the terms Bi, Tri, Quad, and Pent to represent the leg totals of two, three, four, and five respectively.

Figure 5:
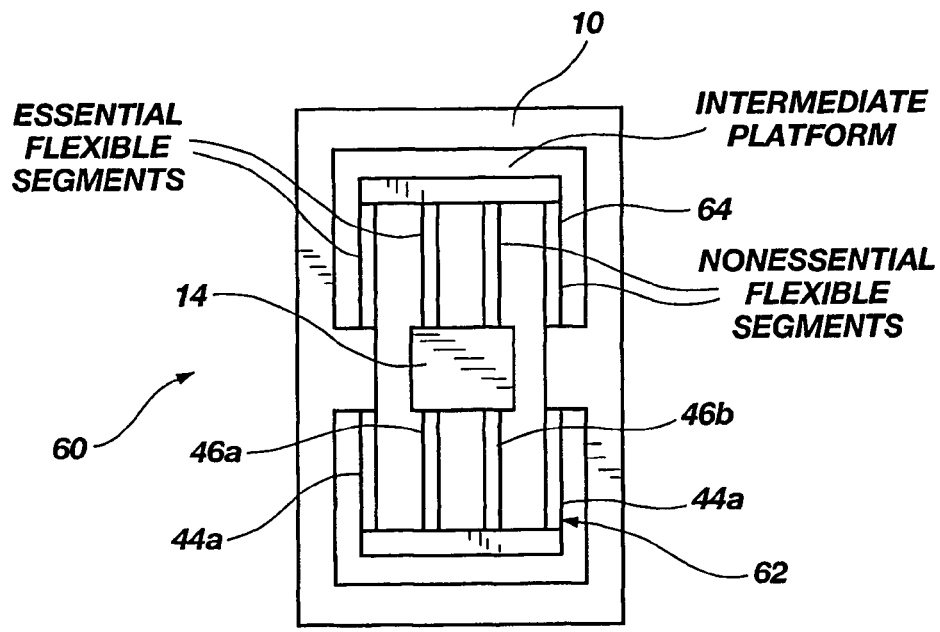
FIG. 5 is a top view of a third presently preferred embodiment of the present invention.
Figures 7A, 7B:
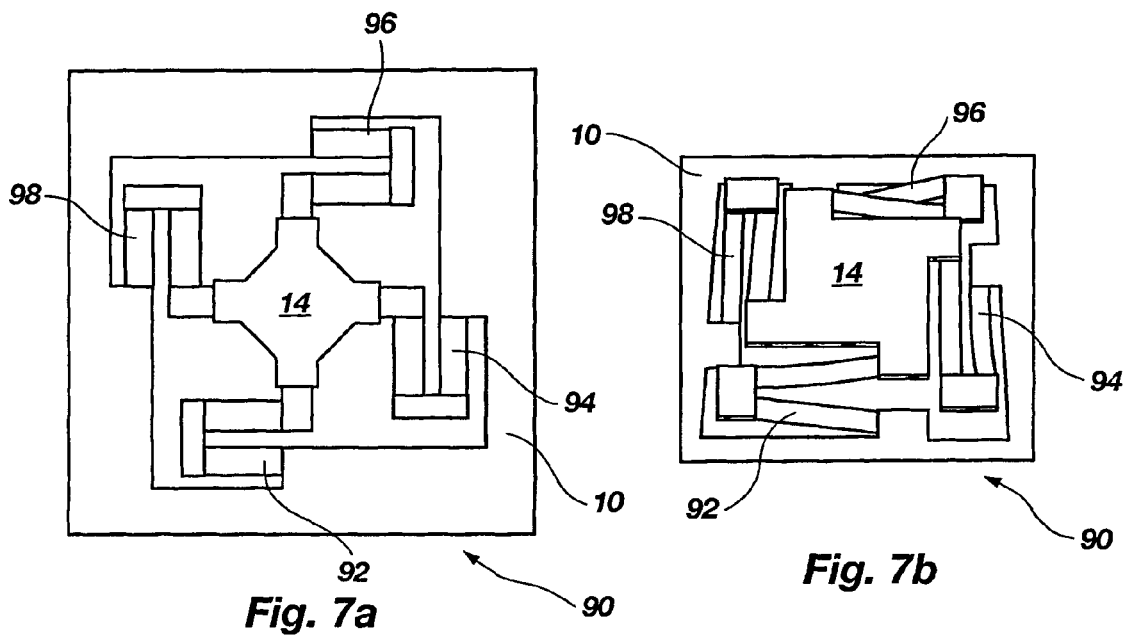
FIG. 7a is a top view of a fourth presently preferred embodiment of the present invention.
FIG. 7b is a perspective view of the fourth presently preferred embodiment of the spring of the present invention.
Figures 8A, 8B:
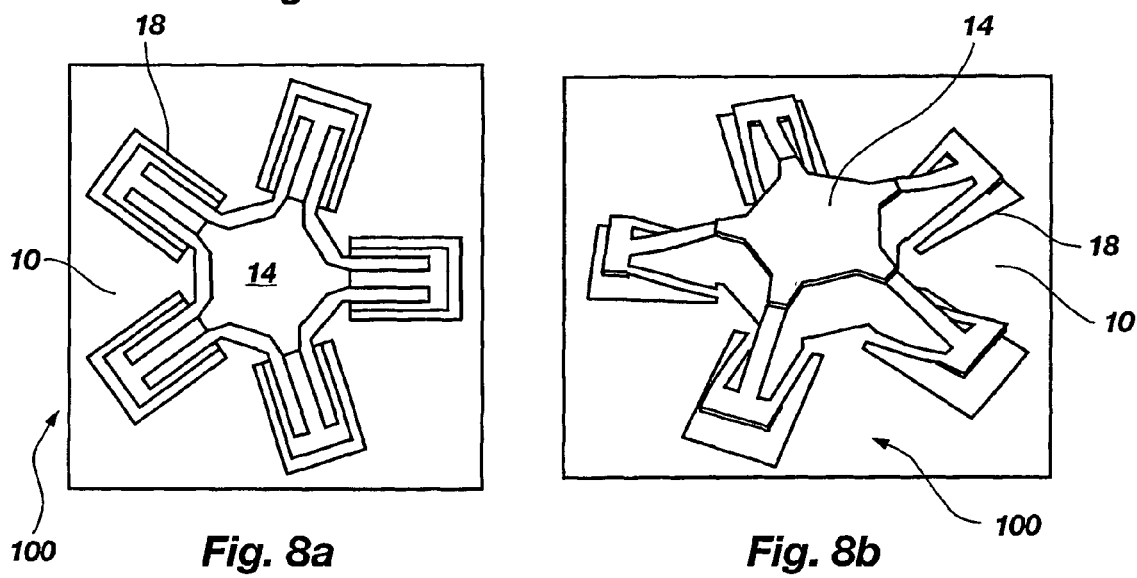
FIG. 8a is a top view of a fifth presently preferred embodiment of a spring of the present invention.
FIG. 8b is a perspective view of the fifth presently preferred embodiment of a spring of the present invention.
Figure 9:
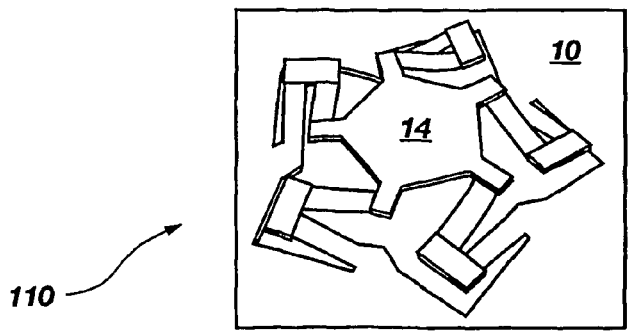
FIG. 9 is a perspective view of a sixth presently preferred embodiment of a spring of the present invention.

For example, referring to FIG. 5, the Bi-type (Bi 2-2R) of spring 60 has two sets of members 62 and 64, which are oriented radially from the axial direction 22. Referring to FIGS. 2a and 2b, the Tri-type (Tri 2-1-R) of spring 70 has three sets of members 72, 74 and 76, which also are oriented radially from the axial direction 22. Similarly, referring to FIGS. 3a and 3b, another Tri-type (Tri 1-1S) of spring 80 has three sets of members 82, 84 and 86, which are oriented laterally with respect to the axial direction 22. Referring to FIGS. 7a and 7b, a Quad-type (Quad 1-1S) of spring 90 has four sets of members 92, 94, 96 and 98, which are oriented laterally. Referring to FIGS. 8a and 8b, the Pent-type (Pent2-1R) of spring 100 has five sets of members oriented radially. Similarly, referring to FIG. 9, another Pent-type (Pent1-1S) of spring 110 has five sets of members oriented laterally.

The second section of the name describes the number of flexible segments 38 within each leg found between the base 10 and the intermediate platform 30, and between the intermediate platform 30 and the platform 14. These numbers are separated by a dash which represents the intermediate platform 30. The classification Tri 2-1 would indicate that the mechanism has three legs or sets, and that each of these legs or sets has two flexible segments 38 between the base 10 and the intermediate platform 30, and one flexible segment 38 between the intermediate platform 30 and the platform 14, as shown in FIG. 2a. It is possible to have a different number or different arrangement of flexible segments 38 on each leg, in which case each leg is called out individually and separated by a colon (e.g. Tri 2-1:1-1:1-2). This can be extended for devices with more legs.

For example, referring again to FIGS. 2a and 2b, the first member 44 extending from the base 10, is split into, or includes, two first members 44a and 44b. It will be noted that the width of the two first members 44a and 44b equals the width of the corresponding single second member 46, so that the forces developed as the members bend cancel one another. Referring again to FIG. 5, each of the first and second members 44 and 46 include two members 44a and 44b, and 46a and 46b, respectively.

The terms radial and side are used to describe separate special cases of the new ortho-planar spring. Other styles and variations will be presented later. For now it is important to say that the leg style is the third section in the newly established classification system. A radial-leg style is represented by the letter R, and the side-leg style or lateral style is represented by the letter S. Other letters and numbers that are found in this section of the mechanism name will be discussed as they are introduced.

As the nomenclature above is useful in describing the invention, another tool (the pseudo-rigid-body model) is valuable in describing the spring motion. When the deflections of the flexible segments 38 are large enough to introduce geometric nonlinearities, linear beam equations are not adequate to accurately predict their behavior. The pseudo-rigid-body model has been developed to simplify the analysis of compliant mechanisms that undergo large deflections (Howell and Midha, 1994, 1995, 1996, Howell et al., 1996). Flexible segments 38 are modeled as rigid links with revolute joints and torsional springs located such that they accurately describe the motion and stiffness of the member. In this way a compliant mechanism can be converted to a rigid-body mechanism for analysis purposes.

Figure 4A:
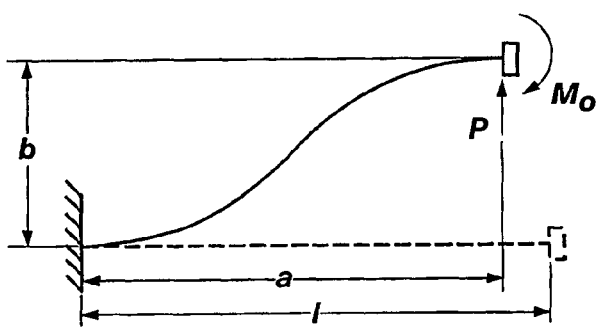
FIG. 4a is a schematic of a segment or member of the present invention.
Figure 4B:
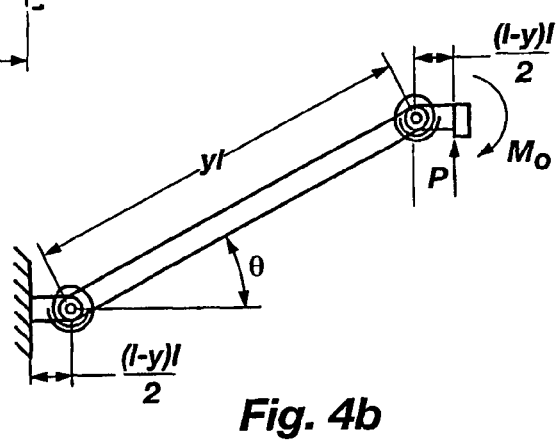
FIG. 4b is a pseudo-rigid-body model of the segment or member of the present invention.

Pseudo-rigid-body models have been developed for various types of segments, but the most critical for this work is for functionally binary fixed-guided segments, as shown in FIGS. 4a and 4b. This type of segment is fixed at one end and the other end is constrained such that it does not rotate. The pseudo-rigid-body model for this segment is represented by a rigid link of length r, where:

$$r = \gamma L \quad (1)$$

where $\gamma$ is the characteristic radius factor (usually $\gamma \approx 0.85$) and L is the length of the flexible segment. The torsional springs each have a torsional spring constant, k, of:

$$k = 2\gamma K_\Theta \frac{EI}{L} \quad (2)$$

where E is Young's modulus, I is the area moment of inertia about the axis of bending, $K_\Theta$ is the stiffness coefficient (usually $K_\Theta \approx 2.65$), and L is the length of the flexible segment. The angle of the link is the pseudo-rigid-body angle, $\Theta$, and the torque at each torsional spring, T, is:

$$T = k\Theta \quad (3)$$

where $\Theta$ is in radians. The coordinates of the end of the segment, (a,b), are $$a = L(1-\gamma(1-\cos\Theta)) \quad (4)$$

and $$b = \gamma L \sin\Theta \quad (5)$$

The maximum stress in the segment, $\sigma_{max}$, occurs at the wall and has a magnitude of $$\sigma_{max} = \frac{Pac}{2I} \quad (6)$$

where P is the applied force and c is the distance from the neutral axis to the outer fibers (usually half the thickness of the beam). These equations can be used to describe the behavior of the springs, which are described next.

Within the radial-leg class, springs can be designed that contain any number of legs greater than 1. Designs with 2, 3, 4, and 5 legs are briefly discussed followed by the introduction of a general set of equations for force displacement and stress.

Figure 6A:
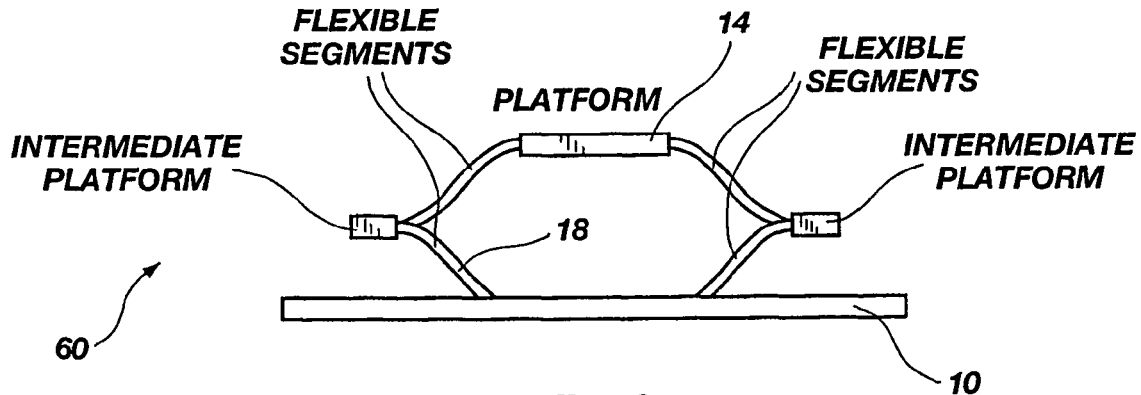
FIG. 6a is a side view of the third presently preferred embodiment of the present invention.
Figure 6B:
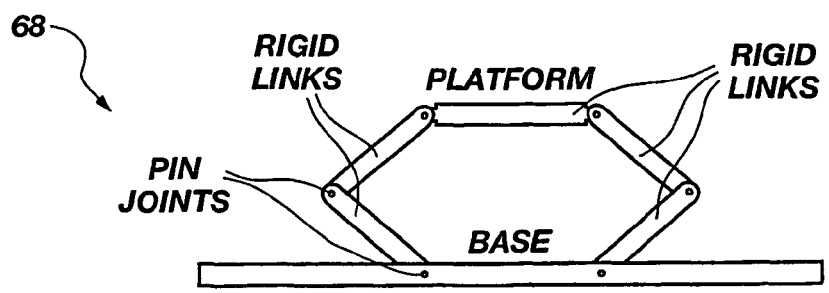
FIG. 6b is a pseudo-rigid-body model of the third presently preferred embodiment of the present invention.

The simplest structure of the radial leg class is the two-leg style 60, as illustrated in FIG. 5. The platform of this mechanism does have the tendency to raise and lower straight up out of the plane without rotation in any direction. However, the pseudo-rigid-body model indicates that this mechanism is not limited to one degree of freedom. FIGS. 6a and 6b show a side view of the two-leg configuration and its rigid-body equivalent 68.

The reason that this configuration displays more than one degree of freedom is because both legs allow for motion to occur along the same two axes. By creating the second leg at some position other than a 180 degree rotation from the first, motion can be allowed straight out of the plane (z-direction) while canceling out all side to side motion (x and y). However, doing this tends to decrease the stability of the platform. For these mechanisms, stability is when the platform does not easily move out of its prescribed motion. The best way to limit the degrees of freedom while maintaining or increasing stability is to increase the number of legs.

Increasing the number of legs to three increases the stability of the platform and decreases the degrees of freedom to one. While the legs can be positioned at various angles around the platform, the most stable configuration is achieved when the legs are separated by 120 degrees. Successful prototyping of the Tri designs has shown this to be an effective ortho-planar linear spring (FIG. 2b).

Configurations of these ortho-planar springs containing both four and five legs were also designed and prototyped. Quad designs do not exhibit more stability than those designs of similar dimensions and three legs. Although, once again, the legs can be spaced at random angles, all of the designs prototyped applied a uniform 90 degree angular spacing between legs. However, this type of symmetric spacing can cause the platform to be somewhat unstable to rotations about its x and y axes.

The Pent design is the most stable of all designs mentioned thus far. This design was also prototyped out of polypropylene (FIGS. 8a and 8b). The added stability is partly due to the fact that adding more legs of the same parameters creates a higher overall stiffness. However, it is also more stable because of the positioning of the legs. If a uniform offset is used, then each leg group is angled 72 degrees from its neighbor. This configuration reduces the instabilities that can occur by the twisting of the flexible segments about their long axes.

Figure 10:
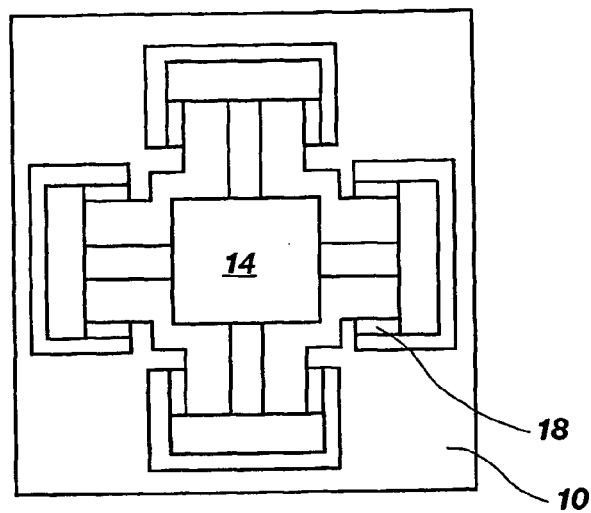
FIG. 10 is a top view of a seventh presently preferred embodiment of a spring of the present invention.

Although the easiest and usually preferred spring designs contain equal length flexible segments, equal length is not required. In other words, as shown in FIG. 10, L1 usually is equal to L2 and L1 is usually equal to L4. However, the required parameter for the defining motion is that the sum of the essential flexible segments be the same for each leg of the spring (L1+L2=L3+L4=L5+L6=L7+L8). While deviations from these requirements may produce close to linear non-rotational motion, the pseudo-rigid body model indicates that it is not a linear motion.

One of the disadvantages of unequal length link designs is that the stresses will be higher in the shorter segments. Another disadvantage is the inefficient use of space to achieve a specified motion. By shortening one of the segments the maximum possible displacement is reduced and the force required to reach any given distance is increased.

The designs shown thus far have had the flexible segments extending radially away from the platform. Another special case of the newly designed ortho-planar springs has its flexible segments positioned to the side of the platform (FIG. 7a). The positioning of the flexible segments in this side-leg design produces a very compact variation of the spring.

Just as those designs with flexible segments extending radially away from the platform, the side-leg design produces multi-degree of freedom or unstable mechanisms with a two-leg design. Designs of three, four, and five legs, however, are more stable.

With three legs positioned 120 degrees apart, a stable one-degree-of-freedom mechanism is produced. FIG. 3b shows a successful prototype of this design.

Ortho-planar configurations of both the Quad (FIG. 7b) and Pent (FIG. 9) designs were constructed out of polypropylene. As is the case with the radial leg designs, the Tri designs are more stable than the Quad designs.

Figure 11A:
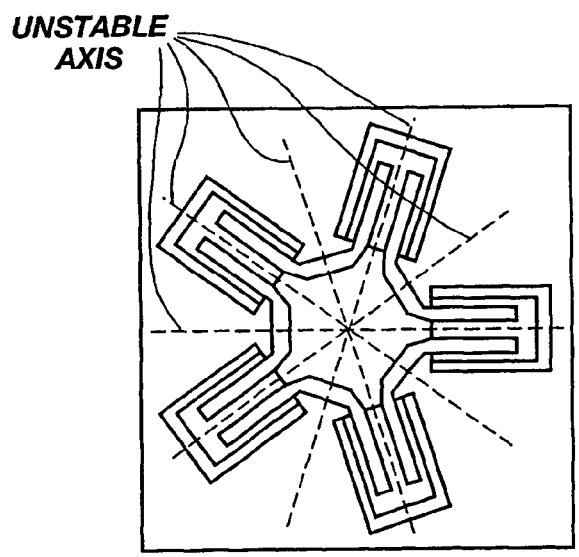
FIG. 11a is another top view of the fifth presently preferred embodiment of a spring of the present invention.
Figure 11B:
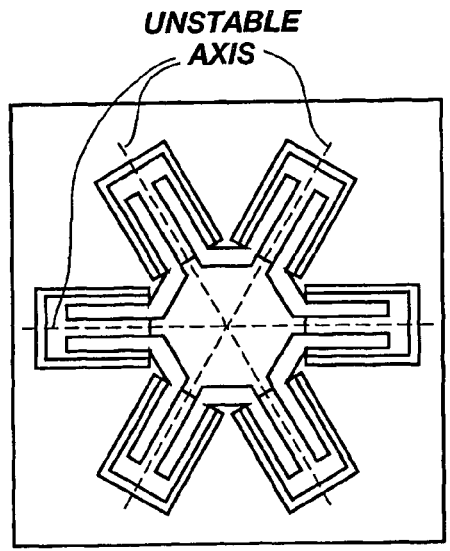
FIG. 11b is a top view of an eighth presently preferred embodiment of a spring of the present invention.

The five-leg designs are more stable, and it is possible that devices with more legs will be even more stable. However, as mentioned earlier, each individual leg tends to rotate about the long axis of its flexible segment. When a radial or side leg design is used, if the leg count is even, then each leg has a leg directly opposite it on the platform that has similar rotational tendencies. Thus, odd number leg counts are more stable than similar even leg count devices (FIGS. 11a and 11b).

Unlike geophone (spider) springs, the new ortho-planar springs do not experience significant rotation of the platform 14. Eliminating rotation eliminates the disadvantages associated with rotation.

Stress for small deflections will be considered next, followed by a discussion of the stress associated with large deflections.

The general equation that holds true for both large and small deflections of bending stress is:

$$\sigma = \frac{Mc}{I} \tag{7}$$

where M is the moment load, c the distance from the neutral axis to the edge, and I is the moment of inertia. The maximum stress is produced by the maximum moment which is described by:

$$M_{MAX} = \frac{FL}{2} \tag{8}$$

where F is the vertical force being applied and L is the length of one flexible segment.

The displacement for a single small-deflection flexible member is a function of force:

$$\delta = \frac{FL^3}{12 \cdot EI} \tag{9}$$

and can be rearranged into $$F = \frac{12\delta EI}{L^3} \tag{10}$$

so that we can substitute equation (10) into (8) and then substitute this equation into equation (7). Because the displacement of the platform is twice that of the intermediate platform, the maximum stress is:

$$\sigma_{MAX} = \frac{3 \cdot \delta_{platform} \cdot E \cdot c}{L^2} \tag{11}$$

Figure 12A:
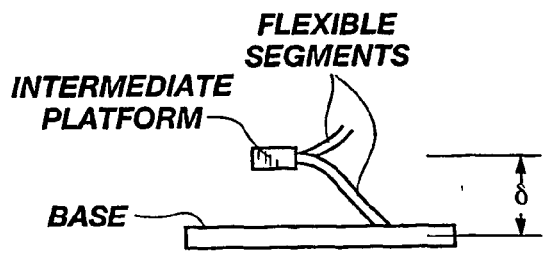
FIG. 12a is a partial side view of the segment or member of the spring of the present invention.
Figure 12B:
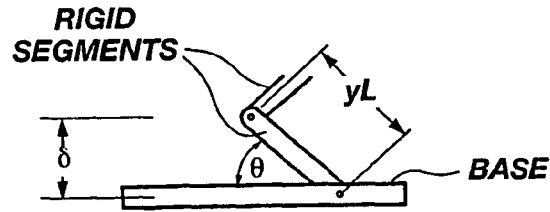
FIG. 12b is a pseudo-rigid-body model of the segment or member of the spring of the present invention.

For large deflections we start with the same basic stress equation. This time, however, the moment and the force equations are more complicated. Using the pseudo-rigid-body model of one fixed-pinned flexible segment (FIGS. 12a and 12b) results in the following stress equation (Derderian, 1996)

$$\sigma_{MAX} = \frac{2K_\Theta Ec(1-\gamma(1-\cos\Theta))\Theta}{L\cos\Theta} \tag{12}$$

In all of the fully compliant ortho-planar spring designs discussed thus far, the displacement has been created by using long flexible fixed-guided segments. Although this is just one of several ways to produce the desired motion, it allows the ortho-planar springs to have large deflections and still be fully compliant (one-piece). These segments will therefore be the basis of the displacement equations discussed in this section.

The familiar spring equation of $$F=k\delta \tag{13}$$

where F is the force, δ is the displacement and k is the spring constant can be used to describe the force required for the displacement of one of the fixed-guided beams. Then define n and m to be the total number of flexible segments between the base and the intermediate platform and between the intermediate platform and the platform, respectively, i.e.

$$n=sa \tag{14}$$

$$m=sb \tag{15}$$

where s is the number of legs, a is the number of segments between the base and the intermediate platform, and b is the number of segments between the intermediate platform and the platform. For a given leg the springs between the base and intermediate platform may be considered to be springs in parallel and their spring constants are added together as $$F_A = \delta \sum_{i=1}^{a} k_i = \delta(k_1 + k_2 + \ldots + k_a) \quad (16)$$

The same is the case for the springs between the intermediate platform and the platform, or $$F_B = \delta \sum_{i=1}^{b} k_i = \delta(k_1 + k_2 + \ldots + k_b) \quad (17)$$

where $F_A$ is the force applied to the segments between the base and the intermediate platform and $F_B$ is the force applied to the segments between the intermediate platform and the platform. Defining $$k_A = k_1 + k_2 + k_3 + \ldots + k_n \quad (18)$$

and $$k_B = k_1 + k_2 + k_3 + \ldots + k_m \quad (19)$$

These equivalent springs are in series, which results in the equation $$\delta_p = \frac{F_A}{k_A} + \frac{F_B}{k_B} \quad (20)$$

where $\delta_p$ is the displacement of the platform or $2\delta$. But because $$F_A = F_B \quad (21)$$

for a given leg, then $$\delta_p = \left(\frac{k_A + k_B}{k_A k_B}\right) F_A \quad (22)$$

or $$F_A = \frac{k_A k_B}{k_A + k_B} \delta_B \quad (23)$$

For all legs, the total force is $$F_A = \frac{s_A s_B}{k_A + k_B} \delta_p \quad (24)$$

If all of the flexible segments have the same value of k, the total equivalent spring will be $$K_{total} = \frac{sakbk}{ak + bk} = \frac{sab}{a+b} k \quad (25)$$

or $$K_{total} = \frac{nm}{n+m} k \quad (26)$$

When this is the case, the equivalent spring can be quickly calculated. For example, a Tri 2-1 would indicate that $$n = 3 \cdot 2 = 6 \quad (27)$$

$$m = 3 \cdot 1 = 3 \quad (28)$$

For small deflections, the displacement of the deflecting members can be defined using equation (9). It can be seen that the spring constant for an individual flexible segment, k, is $$k = \frac{12EI}{L^3} \quad (29)$$

For large deflections $$F = \left(\frac{nm}{n+m}\right)\left(\frac{12K_\Theta EI(\Theta - \Theta_0)}{L^2 \cos\Theta}\right) \quad (30)$$

The angle is related to the deflection of the platform by $$\delta_p = 2\delta L \sin\Theta \quad (31)$$

For large deflections, if the deflection is symmetric such that the deflection between the base and intermediate platform is equal to the deflection between the intermediate platform and the base, then $$F = \frac{4sK_\Theta EI\Theta}{L^2 \cos\Theta} \quad (32)$$

where $$\Theta = a\sin\frac{\delta_p}{2\gamma L} \quad (33)$$

The symmetric deflection occurs when $K_A = K_B$. This is usually the case because it balances the stresses and a larger deflection is obtained for the same size spring when this condition is maintained. However, if the condition is not maintained then the nonlinear equations become much more complicated, and it is just as easy to use nonlinear finite element analysis.

There are many configurations of these new ortho-planar springs that have not yet been discussed. Configurations of 2, 3, 4, and 5 legs have been described, but other numbers of legs are possible. Any of these designs can be created in a fully compliant or partially compliant configuration. Besides these additional configurations, new configurations can be created by using the following: multiple-platforms, multiple flexible segments per leg, curved flexible segments, various angles of attachment, and inversions.

Single level platforms can be combined together to produce multi-story mechanisms 160, like the one shown in FIGS. 13a and 13b. The original platform 14 becomes a sub-platform or primary platform that contains within it a second fully functioning spring. There is no theoretical limit to the number of expansions possible. It is also not a requirement that each level use either the same number of legs or the same type of legs as its predecessor. In continuing with the established classification system of these springs, a multi-level platform is named using the + symbol between complete ortho-planar springs (e.g. Quad 1-1S+Quad 1-1S).

For example, referring to FIGS. 13a and 13b, the spring 160 has a base, primary platform 14, and secondary platform 164 movably coupled to the primary platform 14 and base 10. Like the primary platform 14, the secondary platform 164 is movable along at least a portion of the axial direction 22 without pivoting about the axial direction. A secondary, resilient and flexible connecting structure 168 is connected to and between the primary and secondary platforms 14 and 164, and is similar to the connecting structure 18 described above.

In all of the designs discussed thus far, each leg of the design contained exactly two essential flexible segments per leg. Increasing the number of segments to three or more produces an alternative configuration of the new orthoplanar springs with additional intermediate platforms (FIGS. 14a and 14b). Increasing the number of flexible segments per leg increases the potential displacement of the platform using the same length flexible segments. However, it can also decrease the stability of the platform, especially with four or more segments per leg. In keeping with the established nomenclature, these mechanisms simply have additional intermediate platforms and therefore only require additional dashes (e.g. Quad 2-2-1R).

For example, referring to FIGS. 14a and 14b, each set or leg of the connecting structure 18 of the spring 170 has three members. A first member 172 extends from a first end at the base 10 to a second end at a first intermediate platform 174. A second member 176 extends from a first end at the platform 14 to a second end at a second intermediate platform 178. A third or intermediate member 180 extends between the first and second members 172 and 176, or the first and second intermediate platforms 174 and 178. Again, the non-axial forces developed by the first, second and intermediate members 172, 176 and 180 substantially sum to zero.

Although all of the flexible segments discussed up to this point have been straight when undeflected, curved beams are also acceptable. In some cases curved beams can be used to create an even more compact design than would be possible with straight beams. To continue with the established nomenclature, curved beams are indicated by an additional letter C in the flexible segment section of the name. A prototype that uses curved flexible segments is shown in FIGS. 15a and 15b. Other shapes for the flexible segments can also be used. Each member of the connecting structure 18 of the spring 190 is curved or arcuate.

One way to look at the difference between the side and radial leg designs is to view the side design as a radial design with offset legs (FIGS. 16a and 16b). Using a circular platform, it is feasible to attach the legs at the standard offset positions (radial and side designs) or any other amount of offset in-between the standard side and radial designs (FIG. 16b).

However, when using a non-circular platform it may be easier to compare these differences by looking at the angle formed between the line orthogonal to the platform 14 and the first flexible leg. Under this system the radial leg becomes the zero degree design and the side leg the 90 degree design. It is not only possible to create various angles of attachment between 0 and 90 degrees (FIG. 17c), but also angles greater than 90 degrees (FIG. 17d). Some of these greater than 90 degree attachments may require long attachment bars that extend away from the platform. If this method is used, an extension to the leg class can be added to indicate the angle of attachment (e.g. Tri 1-1S 45).

An inversion is created by choosing a different link to be ground. Inversions of these newly designed ortho-planar mechanisms are created by fixing all of the intermediate platforms or fixing the platform. Fixing the intermediate platforms can cause the creation of a structure with zero degrees of freedom or it can increase the number of degrees of freedom, depending on the arrangement of the flexible segments. Fixing the platform results in the same basic ortho-planar spring where the platform becomes the base and the base becomes the platform.

Figure 19:
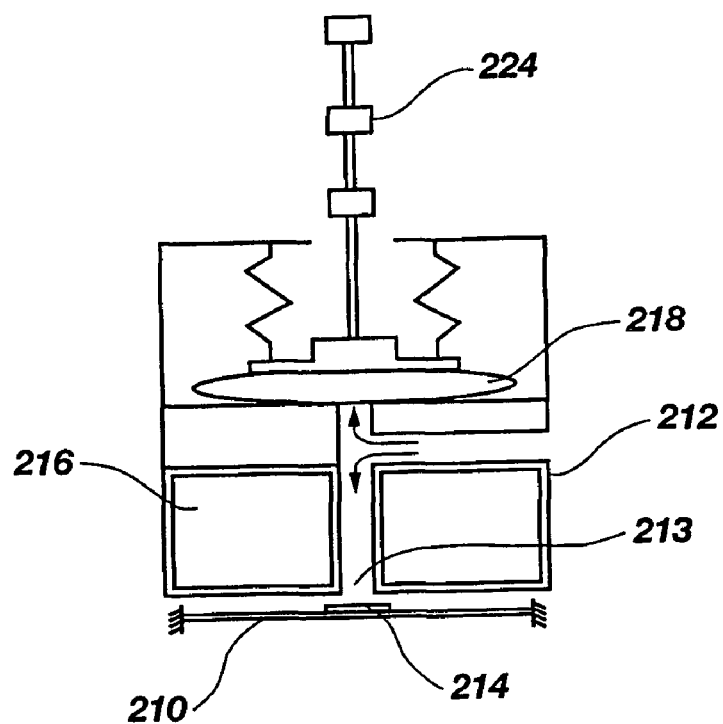
FIG. 19 is a schematic side view of a pneumatic valve controller of the present invention.
Figure 18:
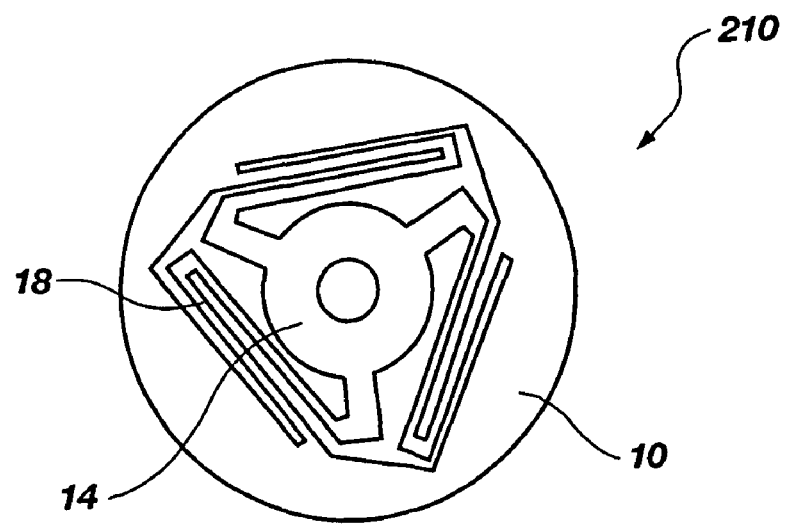
FIG. 18 is a top view of a twelfth presently preferred embodiment of a spring of the present invention for use with a valve controller.

An example of an application of an orthoplanar spring 210 is in a pneumatic valve controller 211, as shown in FIGS. 18 and 19. The spring 210 was laser cut from 0.01 inch thick stainless steel. The valve controller 211 has a valve body 212 with a valve opening 213. A ferrous component or button 214 was attached to the center of the spring 210, and it was then placed near the nozzle opening 213 as shown in FIG. 19. When an electric current goes through the coil 216 it creates a magnetic field. This magnetic field pulls the spring 210 toward the nozzle 213, which in turn restricts the flow of air through the nozzle 213. Restricting the flow causes the pressure to increase and the diaphragm 218 deflects, moving the spool valve 220. The spool valve 220 controls the pressure that positions a much larger pneumatic valve. In this way a small current can be used to position a large valve. This device was successfully implemented in an industrial valve.

Advantages of the orthoplanar spring include its compactness, ease of manufacture (it can be stamped), and its parallel motion which makes it easy to calibrate and less sensitive to variation in the assembly. This example is meant to serve as an illustration of only one of the many potential applications for the invention. Although the spring has been shown with a pneumatic valve controller in a control application, it is of course understood that the spring may be used in other pneumatic applications, including for example, measurement with pneumatic temperature transmitter, transmission, etc., which are well known in the art. In addition, the spring also has other applications, including for example, bolt assemblies, disc brake assemblies, etc.

It is also possible to construct microscopic orthoplanar springs as part of microelectromechanical systems (MEMS). Fabrication methods similar to those used to construct integrated circuits can be used to make the springs. One such method, called surface micromachining, has been used to prototype orthoplanar springs using polycrystalline silicon. All of the discussion above applies to these microscopic springs, they are just very small and require different fabrication methods than is required for macro sized devices.

The compliant ortho-planar spring described here is compact and can undergo a large displacement in either direction. It has advantages over spider springs in that the platform does not rotate in its motion, does not introduce torsional stresses in the flexible segments, and can undergo larger deflections for a given size. It has advantages over disc-type springs in that it is does not require sliding motion between parts connecting to the spring, can undergo larger displacements, and is not as sensitive to variation in assemblies. The lack of rotation and sliding means that the ortho-planar spring can be directly attached to adjacent parts without relative motion. This reduces wear, noise, and reduces particulates caused by abrasive motion in rubbing parts. The particulate reduction can be particularly important in sensitive environments such as microelectronic fabrication equipment.

Springs with multiple legs can be designed, but an odd number of legs was found to be most beneficial. The legs can be at any angle, but the radial and side leg designs are important special cases that are described in detail. Though different lengths can be used between the base and intermediate platform and the intermediate platform and the platform, the stresses are lower for cases where all the flexible member lengths are equal.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A spring comprising:
   a base;
   a platform, movably coupled to the base, and movable linearly along at least a portion of an axial direction without substantial pivoting about the axial direction with respect to the base;
   a resilient and flexible connecting structure, connected to and between the base and platform, and bendable to develop (i) an axial force along the axial direction to bias the platform in a stable position with respect to the base, and (ii) non-axial forces which substantially sum to zero to preserve the orientation of the platform with respect to the base.

2. The spring of claim 1, wherein the base has a base surface, and the platform has a platform surface oriented parallel with the base surface, the base and platform surfaces remaining substantially parallel as the platform moves with respect to the base.

3. The spring of claim 1, wherein the platform is movable to a location in which a surface of the platform is parallel to, and co-planar with, a surface of the base.

4. The spring of claim 1, wherein the base has an aperture and a thickness; and wherein the platform is movable to a location within the aperture of the base, and within the thickness of the base.

5. The spring of claim 4, wherein the connecting structure is movable to a location within the aperture of the base, and within the thickness of the base.

6. The spring of claim 1, wherein at least a portion of each of the base, the platform and the connecting structure are integrally formed from a single sheet of material.

7. The spring of claim 1, wherein the connecting structure has at least one set of flexible and resilient members, coupled in series between the base and platform, and including:
   at least two resilient and flexible members, coupled in series between the base and platform, and bendable to develop (i) an axial force in the axial direction to bias the platform to a stable position with respect to the base, and (ii) non-axial forces.

8. The spring of claim 7, further comprising:
   a second set of at least two resilient and flexible members coupled in series between the base and platform.

9. The spring of claim 7, further comprising:
   second and third sets of at least two resilient and flexible members, the members of each set being coupled in series between the base and platform, to increase the stability of the platform with respect to the base.

10. The spring of claim 7, further comprising:
    fourth and fifth sets of at least two resilient and flexible members, the members of each set being coupled in series between the base and platform.

11. The spring of claim 7, wherein each of the members are oriented to extend substantially radially with respect to the axial direction.

12. The spring of claim 7, wherein each of the members are oriented to extend substantially laterally with respect to the axial direction.

13. The spring of claim 7, wherein each of the members are equal length.

14. The spring of claim 7, wherein each of the members are arcuate.

15. The spring of claim 7, further comprising an intermediate platform disposed between the members.

16. The spring of claim 7, wherein the at least one set of at least two members further includes an intermediate flexible and resilient member, coupled to and between the at least two members.

17. The spring of claim 7, wherein the at least two members includes a first member extending from the base, and a second member extending from the platform and coupled to the first member, and wherein the second member includes a pair of members each extending from the platform and coupled to opposite sides of the first member.

18. The spring of claim 1, wherein the connecting structure has at least two sets of flexible and resilient members, coupled in series between the base and platform, each set including at least two members which are bendable in non-axial directions developing non-axial forces.

19. The spring of claim 1, wherein the platform is a primary platform; and further comprising:
    a secondary platform, movably coupled to the primary platform and base, and movable along at least a portion of the axial direction without pivoting about the axial direction with respect to the primary platform or base;
    a secondary, resilient and flexible connecting structure, connected to and between the primary platform and secondary platform, and bendable to develop (i) an axial force along the axial direction to bias the secondary platform in a stable position with respect to the primary platform, and (ii) non-axial forces which substantially sum to zero to preserve the orientation of the secondary platform with respect to the primary platform.

20. The spring of claim 19, wherein the secondary connecting structure has at least one set of flexible and resilient members, coupled in series between the primary platform and secondary platform, and including:
- at least two resilient and flexible secondary members, coupled in series between the primary platform and secondary platform, and bendable to develop (i) an axial force in the axial direction to bias the secondary platform to a stable position with respect to the primary platform, and (ii) non-axial forces.

21. The spring of claim 1, wherein the spring is associated with a valve opening and means for restricting flow through the valve opening, to bias the means for restricting flow at a position with respect to the valve opening.

22. A spring comprising:
- a base having a base surface;
- a platform, movably coupled to the base, having a platform surface and being movable linearly with respect to the base along at least a portion of an axial direction perpendicular to both the base surface and the platform surface;
- a first flexible and resilient member, extending from the base; and
- a second flexible and resilient member, extending from the platform and coupled to the first member; and
- the first and second members being bendable to develop (i) axial force in the axial direction to bias the platform in a stable position with respect to the base, and (ii) non-axial forces, the non-axial forces of all resilient and flexible members being substantially zero to preserve the orientation of the platform with respect to the base.

23. The spring of claim 22, wherein the base and platform surfaces remain substantially parallel as the platform moves with respect to the base.

24. The spring of claim 22, wherein the platform is movable to a location in which the platform surface is parallel to, and co-planar with, the base surface.

25. The spring of claim 22, wherein the base has an aperture and a thickness; and wherein the platform is movable to a location within the aperture of the base, and within the thickness of the base.

26. The spring of claim 25, wherein the first and second members are movable to a location within the aperture of the base, and within the thickness of the base.

27. The spring of claim 22, wherein at least a portion of each of the base, the platform and the members are integrally formed from a single sheet of material.

28. The spring of claim 22, further comprising at least two first members extending from the base, and at least two second members, each extending from the platform and coupled to one of the first members.

29. The spring of claim 22, further comprising at least three first members extending from the base, and at least three second members, each extending from the platform and coupled to one of the first members, to increase the stability of the platform with respect to the base.

30. The spring of claim 22, further comprising at least five first members extending from the base, and at least five second members, each extending from the platform and coupled to one of the first members, to increase the stability of the platform with respect to the base.

31. The spring of claim 22, wherein the first and second members are oriented to extend substantially radially with respect to the axial direction.

32. The spring of claim 22, wherein the first and second members are oriented to extend substantially laterally with respect to the axial direction.

33. The spring of claim 22, wherein the first and second members are equal length.

34. The spring of claim 22, wherein the first and second members are arcuate.

35. The spring of claim 22, further comprising an intermediate platform disposed between the first and second members.

36. The spring of claim 22, further comprising at least two sets of first and second members which are bendable in non-axial directions developing non-axial forces.

37. The spring of claim 22, further comprising an intermediate flexible and resilient member, coupled to and between the first and second members.

38. The spring of claim 22, wherein the second member includes a pair of members each extending from the platform and coupled to opposite sides of the first member.

39. The spring of claim 22, wherein the platform is a primary platform; and further comprising:
- a secondary platform, movably coupled to the primary platform and base, and movable along at least a portion of the axial direction;
- a third flexible and resilient member, extending from the primary platform; and
- a fourth flexible and resilient member, extending from the secondary platform and coupled to the third member; and
- the third and fourth members being bendable to develop (i) axial force in the axial direction to bias the second platform to a stable position with respect to the primary platform, and (ii) non-axial forces.

40. A spring comprising:
- a base having a base surface;
- a platform, movably coupled to the base, having a platform surface and being movable linearly with respect to the base along at least a portion of an axial direction perpendicular to both the base surface and the platform surface;
- a connecting structure, connected to and between the base and platform, having at least one set of flexible and resilient members, coupled in series between the base and platform, and bendable to bias the platform with respect to the base along the axial direction, the set of members including at least:
  i) a first member, connected to and extending from the base; and
  ii) a second member, extending from the platform and coupled to the first member; and
- the first and second members being bendable to develop (i) axial force in the axial direction to bias the platform in a stable position with respect to the base, and (ii) non-axial force, all non-axial force of the connecting structure substantially summing to zero.

41. The spring of claim 40, wherein the connecting structure further includes at least three sets of flexible and resilient members, the members of each set being connected in series between the base and platform, the members of each set being bendable to bias the platform with respect to the base along the axial direction, and each set including at least:
  i) a first member, connected to and extending from the base, which is bendable in the axial direction and a non-axial direction to develop an axial force and a non-axial force; and
  ii) a second member, extending from the platform and coupled to the first member, which is bendable in the axial direction and a non-axial direction to develop an axial force and a non-axial force; and wherein all non-axial forces of the connecting structure substantially sum to zero.

42. The spring of claim 41, further comprising fourth and fifth sets of at least two resilient and flexible members, the members of each set being coupled in series between the base and platform.

43. The spring of claim 40, wherein each of the members are oriented to extend substantially radially with respect to the axial direction.

44. The spring of claim 40, wherein each of the members are oriented to extend substantially laterally with respect to the axial direction.

45. The spring of claim 40, wherein each of the members are equal length.

46. The spring of claim 40, wherein each of the members are arcuate.

47. The spring of claim 40, further comprising an intermediate platform disposed between the members.

48. The spring of claim 40, wherein the connecting structure includes at least two sets of first and second members which are bendable in non-axial directions developing non-axial forces.

49. The spring of claim 40, wherein the at least one set of at least two members further includes an intermediate flexible and resilient member, coupled to and between the at least two members.

50. The spring of claim 40, wherein the at least two members includes a first member extending from the base, and a second member extending from the platform and coupled to the first member, and wherein the second member includes a pair of members each extending from the platform and coupled to opposite sides of the first member.

51. The spring of claim 40, wherein the platform is a primary platform; and further comprising:
 a secondary platform, movably coupled to the primary platform and base, and movable along the axial direction without pivoting with respect to the primary platform or base;
 at least two resilient and flexible secondary members, coupled in series between the primary platform and secondary platform, and bendable to bias the secondary platform with respect to the primary platform, the members being bendable in non-axial directions developing non-axial forces, the sum of all non-axial forces developed by secondary members being substantially zero to preserve the orientation of the secondary platform with respect to the primary platform.

52. The spring of claim 40, wherein the base has a base surface, and the platform has a platform surface oriented parallel with the base surface, the base and platform surfaces remaining substantially parallel as the platform moves with respect to the base.

53. The spring of claim 40, wherein the platform is movable to a location in which a surface of the platform is parallel to, and co-planar with, a surface of the base.

54. The spring of claim 40, wherein the base has an aperture and a thickness; and wherein the platform is movable to a location within the aperture of the base, and within the thickness of the base.

55. A spring comprising:
 a base;
 a platform, movably coupled to the base, and movable linearly along at least a portion of an axial direction without substantial pivoting about the axial direction with respect to the base; and
 a connecting structure including at least two resilient and flexible members coupled in series between the base and platform, and bendable to develop (i) an axial force along the axial direction to bias the platform in a stable position with respect to the base, and (ii) non-axial forces which substantially sum to zero to preserve the orientation of the platform with respect to the base.

56. The spring of claim 55, wherein the at least two resilient and flexible members are oriented parallel to one another.

* * * * *